US012488464B2

(12) United States Patent
Borse et al.

(10) Patent No.: US 12,488,464 B2
(45) Date of Patent: Dec. 2, 2025

(54) PANOPTIC SEGMENTATION WITH PANOPTIC, INSTANCE, AND SEMANTIC RELATIONS

(71) Applicant: QUALCOMM Incorporated, San Diego, CA (US)

(72) Inventors: Shubhankar Mangesh Borse, San Diego, CA (US); Hyojin Park, San Diego, CA (US); Hong Cai, San Diego, CA (US); Debasmit Das, San Diego, CA (US); Risheek Garrepalli, San Diego, CA (US); Fatih Murat Porikli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 656 days.

(21) Appl. No.: 17/807,614

(22) Filed: Jun. 17, 2022

(65) Prior Publication Data
US 2023/0154005 A1    May 18, 2023

Related U.S. Application Data

(60) Provisional application No. 63/280,006, filed on Nov. 16, 2021.

(51) Int. Cl.
*G06T 7/10*        (2017.01)
*G06N 3/08*        (2023.01)

(52) U.S. Cl.
CPC ............. *G06T 7/10* (2017.01); *G06N 3/08* (2013.01); *G06T 2207/20081* (2013.01); *G06T 2207/20084* (2013.01)

(58) Field of Classification Search
CPC ............ G06T 7/10; G06T 2207/20081; G06T 2207/20084; G06T 7/11; G06N 3/08; G06N 3/045
See application file for complete search history.

(56) References Cited

U.S. PATENT DOCUMENTS

| 2020/0151497 | A1* | 5/2020 | Kojima | G06T 7/11 |
| 2021/0158043 | A1* | 5/2021 | Hou | G06V 10/454 |
| 2021/0326338 | A1 | 10/2021 | Alison et al. | |

(Continued)

FOREIGN PATENT DOCUMENTS

WO    2020257812 A2    12/2020

OTHER PUBLICATIONS

International Search Report and Written Opinion—PCT/US2022/079927—ISA/EPO—Mar. 13, 2023.

(Continued)

*Primary Examiner* — Tom Y Lu
(74) *Attorney, Agent, or Firm* — QUALCOMM Incorporated

(57) ABSTRACT

Aspects of the present disclosure relate to a novel framework for integrating both semantic and instance contexts for panoptic segmentation. In one example aspect, a method for processing image data includes: processing semantic feature data and instance feature data with a panoptic encoding generator to generate a panoptic encoding; processing the panoptic encoding to generate a panoptic segmentation features; and generating the panoptic segmentation mask based on the panoptic segmentation features.

19 Claims, 5 Drawing Sheets

(56) References Cited

U.S. PATENT DOCUMENTS

2021/0326656 A1* 10/2021 Lee ...................... G06F 18/217
2022/0172369 A1* 6/2022 Tang ...................... G06N 3/044

OTHER PUBLICATIONS

Li Y., et al., "Attention-Guided Unified Network for Panoptic Segmentation", 2019 IEEE/CVF Conference on Computer Vision and Pattern Recognition (CVPR), IEEE, Jun. 15, 2019 (Jun. 15, 2019), pp. 7019-7028, XP033686460, DOI: 10.1109/CVPR.2019.00719 [retrieved on Jan. 8, 2020] section 3.1, section 3.2, section 3.3.1, section 3.4, figures 2,3.

Liu D., et al., "Panoptic Feature Fusion Net: a Novel Instance Segmentation Paradigm for Biomedical and Biological Images", IEEE Transactions on Image Processing, IEEE, USA, vol. 30, Jan. 15, 2021 (Jan. 15, 2021), pp. 2045-2059, XP011832794, ISSN: 1057-7149, DOI: 10.1109/TIP.2021.3050668 [retrieved on Jan. 21, 2021] section I.

\* cited by examiner

PANOPTIC SEGMENTATION WITH PANOPTIC, INSTANCE, AND SEMANTIC RELATIONS

CROSS-REFERENCE TO RELATED APPLICATIONS

This application claims the benefit of and priority to U.S. Provisional Patent Application No. 63/280,006, filed on Nov. 16, 2021, the entire contents of which are incorporated herein by reference.

INTRODUCTION

Aspects of the present disclosure relate to a novel framework for integrating both semantic and instance contexts for panoptic segmentation.

Computer vision techniques, such as image classification and object detection, are used extensively to solve various computer vision problems. In image classification, an entire image is classified, and object detection extends image classification by detecting the location of individual objects present in an image.

Some computer vision problems require deeper understanding of the contents in the images, and conventional classification and object detection may not be suitable to solve these problems. These challenges have given rise to image segmentation, which is generally the task of classifying an image at the pixel level. Beneficially, image segmentation can provide detailed information about objects present in an image, which generally cannot be provided by classifying the entire image or providing bounding boxes for the objects present in the image. Examples of use cases for image segmentation include: efficient vision system for driverless cars for an effective road scene's understanding; medical image segmentation for diagnostics; satellite imagery analysis; and others.

Conventionally, image segmentation has been divided into two related techniques: (1) semantic segmentation, in which objects classified with the same pixel values are segmented with the same label (e.g., foreground versus background objects in an image; and (2) instance segmentation, in which different instances of the same type (or class) of object are segmented with different labels. Generally, these two techniques have been implemented in separate models, which increases computational complexity, training time, and the like.

Accordingly, improved techniques for image segmentation are needed.

BRIEF SUMMARY

Certain aspects provide a method for processing image data, comprising: processing semantic feature data and instance feature data with a panoptic encoding generator to generate a panoptic encoding; processing the panoptic encoding to generate panoptic segmentation features; and generating the panoptic segmentation mask based on the panoptic segmentation features.

Other aspects provide processing systems configured to perform the aforementioned methods as well as those described herein; non-transitory, computer-readable media comprising instructions that, when executed by a processor of a processing system, cause the processing system to perform the aforementioned methods as well as those described herein; a computer program product embodied on a computer-readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

BRIEF DESCRIPTION OF THE DRAWINGS

The appended figures depict certain aspects of the one or more aspects and are therefore not to be considered limiting of the scope of this disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1:
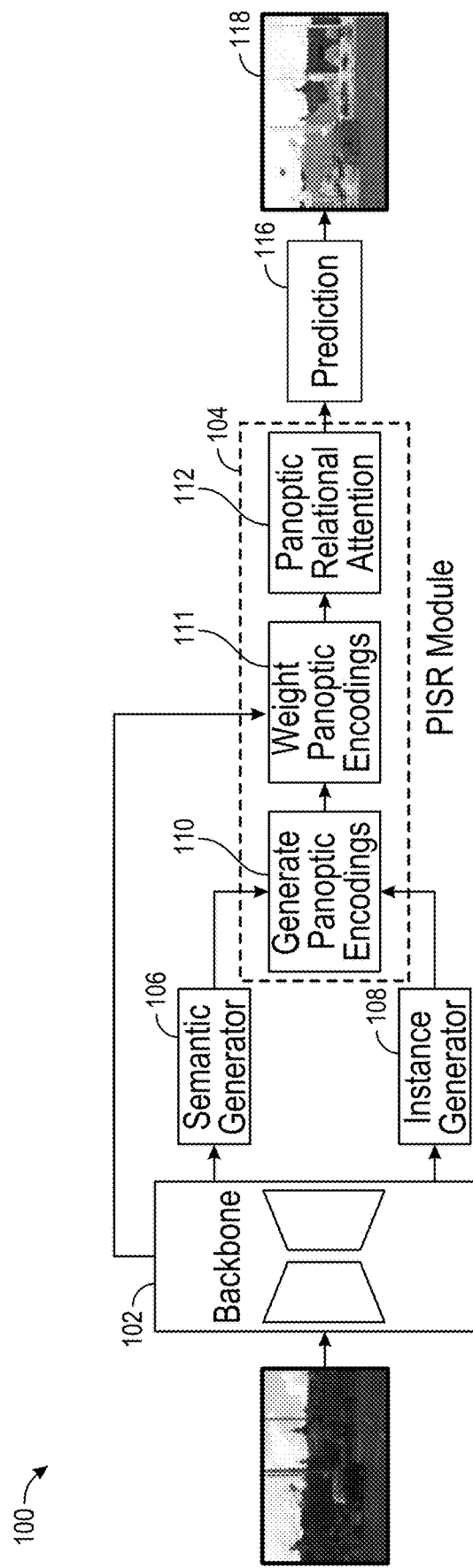
FIG. 1 depicts a model architecture for performing panoptic segmentation with a panoptic, instance, and semantic relations (PISR).

Aspects of the present disclosure provide apparatuses, methods, processing systems, and non-transitory computer-readable mediums for integrating both semantic and instance contexts for panoptic segmentation.

Instance segmentation is generally the task of assigning each pixel in an image to a countable object, regardless of its semantic label. Instance segmentation has a similar goal as object detection, but instance segmentation generally produces finer and more accurate object boundaries.

Semantic segmentation is generally the task of producing semantic class labels for each pixel in an image, without considering the fact that the pixel might belong to different instances of the same semantic category. Aspects described herein use the contextual relations between "things" and "stuff" to improve the quality of both semantic and instance segmentation. Things generally include countable objects, such as cars and pedestrians, and stuff generally refers to uncountable concepts, such as sky and vegetation.

Panoptic segmentation combines instance and semantic segmentation and aims to assign both instance and semantic labels to each image pixel in an image. Aspects described herein present a novel framework to integrate both semantic and instance contexts for panoptic segmentation. Aspects described herein overcome a challenge of conventional semantic or instance segmentation, which have conventionally used separate modules for the two tasks, such as a Mask-Region-Based Convolutional Neural Networks (R-CNN) module for instance segmentation and an fully convolutional network (FCN) module for semantic segmentation. In conventional arrangements, the two outputs (i.e., of the Mask-RCNN and FCN modules) are combined during post-processing to generate panoptic segmentation. However, the accuracy of the panoptic segmentation in such implementations heavily relies on the object detection quality, and having two separate modules can lead to expensive, redundant computation.

By contrast, aspects described herein present a novel relational attention module, which may be referred to as a panoptic, instance, and semantic relations (PISR) module. In various aspects, a PISR module takes into account both semantic classes and important instances in the image and utilizes attention to derive features that encode the relationships among semantic classes and instances. Beneficially, three kinds of relationships are captures in PISR: (1) relationships among semantic classes; (2) relationships among instances; and (3) relationships across semantic classes and instances. Moreover, a PISR module may beneficially be integrated with existing panoptic segmentation networks, such as the Panoptic-DeepLab, UperNet, and Maskformer. For example, the PISR module may replace the existing panoptic segmentation module in such existing networks. Thus, unlike conventional approaches, aspects described herein exploit relationships among semantic classes and instance for panoptic segmentation.

Thus, aspects described herein relate to a novel relational attention method for panoptic segmentation that may be applied to myriad types of models and datasets. Beneficially, the panoptic segmentation methods described herein consider the distribution of every panoptic category in order to drop less important information for robust more embeddings, and use only confident instance information for training and inference. Aspects described herein accordingly provide more-accurate delineation of boundaries of instances and semantic classes and more-accurate classifications, which overcomes deficiencies with existing models that are prone to errors when interpreting various objects in scenes, such as objects with reflective surfaces. For example, conventional models tend to classify instances of sky reflected in a building as sky rather than the building, while the PISR modules described herein correctly identify the reflection as part of the building.

Applying PISR for Panoptic Segmentation

FIG. 1 depicts a model architecture 100 for performing panoptic segmentation with a panoptic, instance, and semantic relations (PISR) module 104.

A panoptic segmentation architecture generally includes: (1) a backbone network 102 for feature extraction, (2) a semantic generator 106 that outputs semantic segmentation estimates, (3) an instance generator 108 that outputs instance segmentation estimates, and (4) a post-processing block that combines the two types of segmentation to produce a final panoptic segmentation. Improving upon conventional approaches, architecture 100 includes a PISR module 104, which includes a panoptic encoding generator (or element) 110 (instead of a conventional post-processing module), a panoptic encoding weighting module (or element) 111, and a panoptic relational attention module (or element) 112.

In the depicted example, backbone network 102 is generally a machine learning model, such as a neural network model configured as a base (or global) feature generator. In some aspects, backbone network 102 may be a network, such as ResNet-50, ResNet-101, HRNet-w48, Swin-L and ResNet-50-FPN, and the like.

Semantic generator 106 and instance generator 108 may be implemented as neural network models. In some aspects, semantic generator 106 and instance generator 108 may include one or more convolutional layers as well as one or more non-convolutional layers.

Panoptic encoding generator 110 is configured to take as input the semantic outputs (e.g., "stuff") and instance outputs (e.g., "things") from the semantic and instance generators 106 and 108, respectively. It then generates an encoding for each panoptic category (e.g., a semantic class or an instance). Generating panoptic encodings is described in further detail with respect to FIG. 2.

In some aspects, panoptic encoding generator 110 only takes the top K most confident predictions to confine the instances to more reliable ones. Each semantic class and each selected instance in these outputs may be referred to as a panoptic category (e.g., the car class, person 1, person 2, etc.). Generally, Panoptic encoding generator 110 generates an initial encoding for each panoptic category, which summarizes the key features of the pixels assigned to that category.

The output of panoptic encoding generator 110 (panoptic encodings) is then processed by panoptic encoding weighting module 111, which is configured to reweight the initial panoptic encodings to highlight the more important ones. Further details of the reweighting performed by panoptic encoding weighting module 111 is described below with respect to FIG. 3.

Next, the output of panoptic encoding weighting module 111 (weighted panoptic encodings) are processed by panoptic relational attention module 112, which captures several types of relationships, including (1) the relationship among semantic classes, (2) the relationship among instances, and (3) the relationships across semantic classes and instances. These correlations lead to improved panoptic relational features for the final panoptic segmentation 118. In addition, when applying attention in relational attention module 112, a learnable scheme is introduced to place more weight on instances that are relevant for the segmentation.

Next, the panoptic relational features output from panoptic relational attention module 112 are processed by a prediction module 116 to generate the final panoptic segmentation 118. Generally, prediction module 116 may be a neural network structure configured to produce the final panoptic segmentation 118. For example, in one aspect, prediction module 116 may comprise a fully-connected layer for outputting the final panoptic segmentation 118. In another aspect, prediction module 116 may be configured to process panoptic relational features with semantic generator 106 and instance generator 108 to generate the final panoptic segmentation 118, though this is not depicted in FIG. 1. In other words, the output of PISR module 104 may be post-processed by semantic generator 106 and instance generator 108 to generate the final panoptic segmentation 118.

When end-to-end training an architecture (e.g., 100) with a PISR module (e.g., 104), the usual semantic and instance segmentation losses may be applied to the final estimated outputs. In addition, semantic and instance losses may be applied to the intermediate outputs from the semantic and instance generators (106 and 108 in FIG. 1). More formally, the total training loss function can be written as follows:

$$\mathcal{L} = \mathcal{L}'_{sem} + \mathcal{L}'_{ins} + \mathcal{L}_{sem} + \mathcal{L}_{ins} \quad (1)$$

where $\mathcal{L}_{sem}$ and $\mathcal{L}_{ins}$ are the loss functions for predicting final instance and semantic segmentations, respectively, and $\mathcal{L}'_{sem}$ and $\mathcal{L}'_{ins}$ are the intermediate semantic and instance loss functions, respectively. For both intermediate and final loss terms, the semantic segmentation loss may be determined by a cross-entropy loss and the instance segmentation loss may be determined by a mean squared error (MSE) loss for center heatmaps and an L1 loss for center offsets.

Generally, an L1 loss function, such as a least absolute deviation function, is used to minimize the error which is the sum of the all the absolute differences between the true value and the predicted value.

Generating Panoptic Encodings

Figure 2:
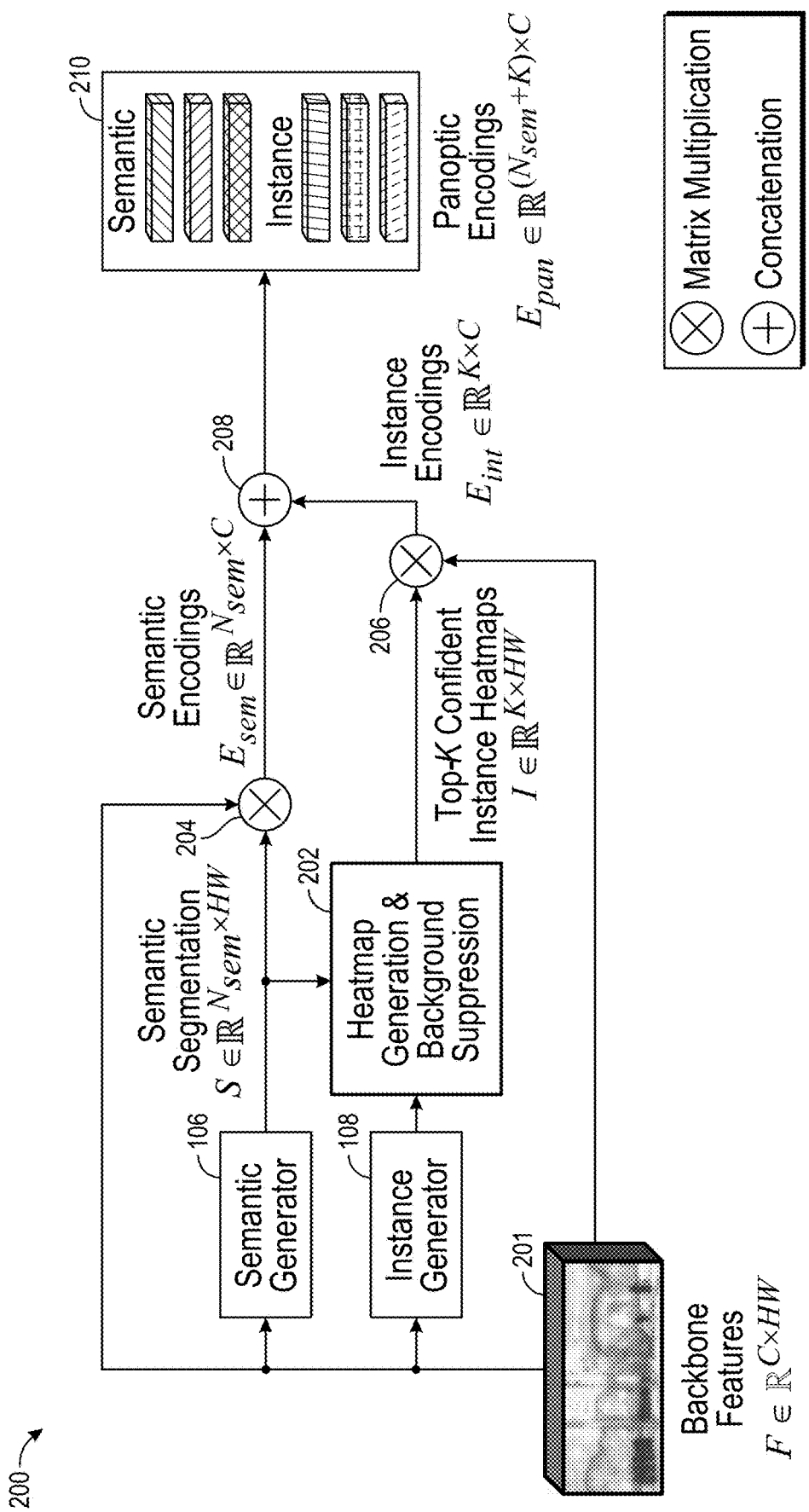
FIG. 2 depicts an example architecture for embedding instance and semantic information to generate panoptic encodings.

FIG. 2 depicts an example architecture 200 for embedding instance and semantic information to generate panoptic encodings, such as may be used by panoptic encoding generator 110 of FIG. 1.

Given features 201 supplied by a backbone network (e.g., 102 in FIG. 1), panoptic encodings may be generated that summarize the key features of the semantic classes and instances in input data (e.g., image data). In some aspects, the key features may be based on a selected subset of instances, such as the top K instances, as described above.

In regard to semantic encodings generated by semantic generator 106, suppose that the backbone network 102 generates a feature map $F \in \mathbb{R}^{C \times HW}$ (201), where C, H, and W are the number of channels, height, and width of the feature map, respectively. Taking F as input 201, the semantic generator 106 produces a soft semantic segmentation map $S \in \mathbb{R}^{N_{sem} \times HW}$, where $N_{sem}$ is the number of semantic classes, which includes, for each pixel location, a probability vector that indicates how likely this pixel belongs to different classes. The semantic encodings $E_{sem} \in \mathbb{R}^{N_{sem} \times C}$ may be calculated by multiplying S and F at operation 204 to generate encodings $E_{sem} = SF^T$. These encodings contain the most prominent features for the semantic classes.

In regard to instance encodings generated by instance generator 108, standard instance predictions contain a center mass $M \in \mathbb{R}^{1 \times HW}$ and a center offset $O \in \mathbb{R}^{2 \times HW}$. M is the "objectness" score, which may be used to select the top K most confident center locations. Given these K selected centers, K heatmaps 202 are produced based on their respective center offsets.

Next, the predicted semantic segmentation S is converted into a binary segmentation of "things" and "stuff", and then multiplied with the heatmaps 202 in order to suppress the background. The resulting instance heatmaps are denoted as $I \in \mathbb{R}^{K \times HW}$. Finally, the instance encodings $E_{ins} \in \mathbb{R}^{K \times C}$ are calculated by multiplying I and F at operation 206 to generate encodings $E_{ins} = IF^T$.

Finally, the semantic encodings $E_{sem}$ and instance encodings $E_{ins}$ are concatenated at operation 208 to form the final panoptic encodings (210): $E_{pan} \in \mathbb{R}^{(N_{sem}+K) \times C}$ Each panoptic encoding 210 summarizes the key features of a semantic class or one of the selected instances.

Weighting Panoptic Encodings

Figure 3:
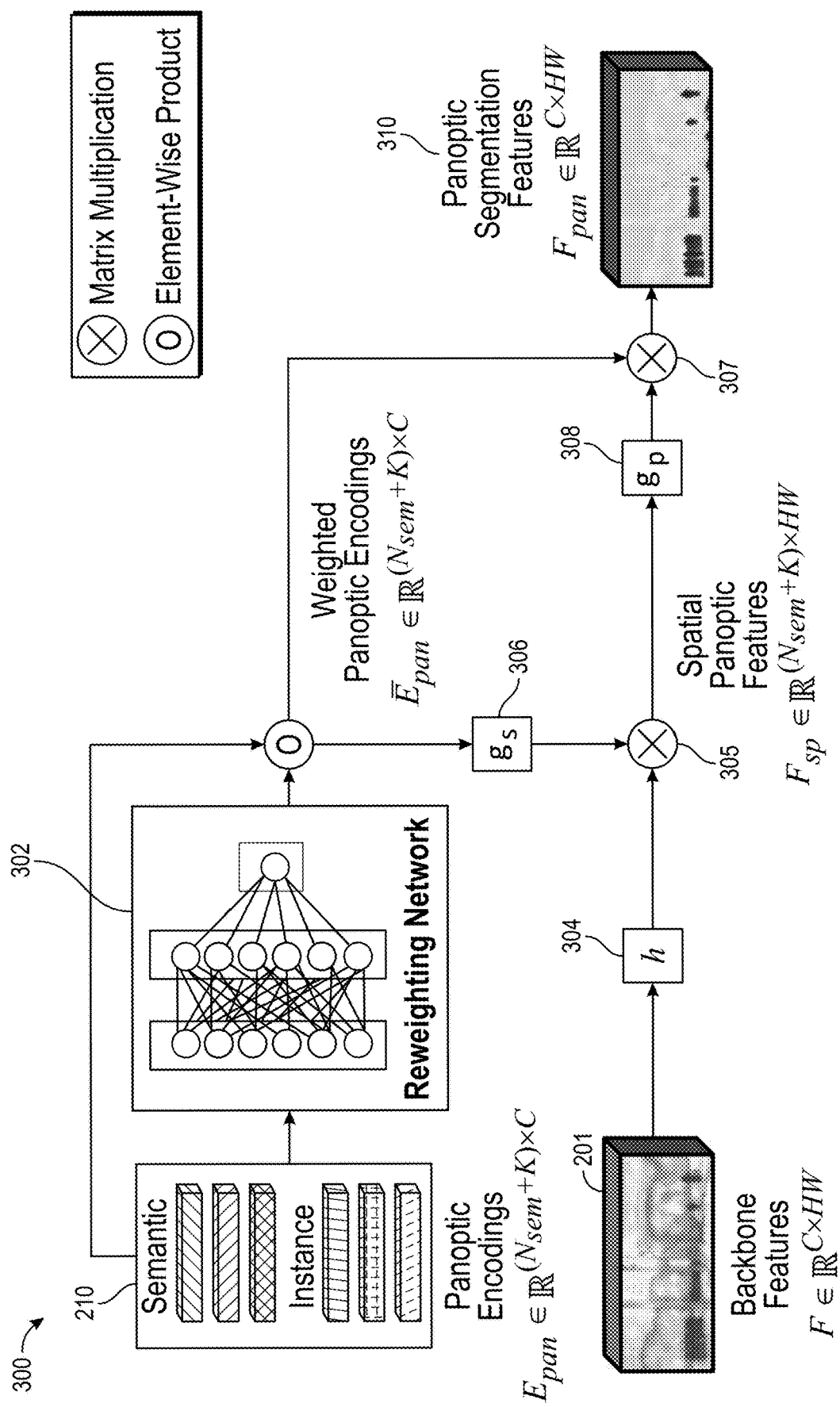
FIG. 3 depicts an example architecture for implementing panoptic encoding weightings and panoptic relational attention.

The panoptic encodings $E_{pan}$ (210, as described above with respect to FIG. 2) may be further reweighted based on their importance. Aspects of FIG. 3 are configured for performing this reweighting, as thus may be implemented by panoptic encoding weighting module 111 of FIG. 1.

In some aspects, a lightweight two-layer convolutional network 302 with a sigmoid output layer, which may be referred to as a reweighting network, may be used generate the weights. In particular, the reweighting network 302 takes $E_{pan}$ as input and outputs the weight vector $\omega \in \mathbb{R}^{(N_{sem}+K) \times 1}$. Each element in $\omega$ is a predicted importance score for a panoptic category. The weighted panoptic encodings may then be computed as follows: $\tilde{E}_{pan} = E_{pan} \circ \omega 1$, where $1 \in \mathbb{R}^{(N_{sem}+K) \times C}$ is a matrix whose entries are all ones and $\circ$ denotes elementwise multiplication.

By reweighting the panoptic encodings, the PISR module (e.g., 104 in FIG. 1) learns to focus on the important semantic classes and instances, while suppressing the less relevant ones. Beneficially, the reweighting network 302 makes the PISR module to be more robust to the choice of K. For example, as K increases, reweighting network 302 improves the panoptic segmentation by the PISR module, whereas the performance might otherwise degrade without weighting as K increases.

Panoptic Relational Attention

FIG. 3 further depicts aspects for implementing panoptic relational attention.

Panoptic segmentation benefits from a holistic understanding of the entire scene, including both "things" and "stuff," as described above. However, existing approaches do not fully utilize the relationships across semantic classes and instances. Consequently, an instance prediction "head" is not aware of the semantic classes, while a semantic "head" does not know the instances in the image in existing approaches. As referred to herein, a "head" of a machine learning model may generally refer to a portion of the model intended to generate a certain type of inference or prediction, such as (in the case above) a predicted instance or a predicted semantic class. Different "heads" may be used with a common underlying model portion, such as a feature extractor.

To enable the network to leverage the underlying relational contexts, a panoptic relational attention (PRA) module (e.g., 112 in FIG. 1) may be used to compute the correlations across the panoptic categories based on the panoptic encodings. As depicted in FIG. 3, the PRA module takes as inputs global features F and panoptic encodings $\tilde{E}_{pan}$ as input. Two stages of attention are then applied to extract various types of correlations between the inputs.

First, the weighted panoptic encodings are correlated with the spatial features in operation 305, which produces spatial panoptic features (e.g., a spatial panoptic feature map):

$$F_{sp} = g_s(\tilde{E}_{pan}) h(F)$$

where $F_{sp} \in \mathbb{R}^{(N_{sem}+K) \times HW}$, and $g_s$ (306 in FIG. 3) and h (304 in FIG. 3) are 1×1 and 3×3 convolutional layers, respectively. This captures the panoptic signals in each pixel location.

Next, the spatial panoptic feature map $F_{sp}$ is correlated with the weighted panoptic encodings $\tilde{E}_{pan}$ at operation 307, which produces the final panoptic segmentation features:

$$F_{pan} = g_p(\tilde{E}_{pan}^T) h(F_{sp}),$$

where $F_{pan} \in \mathbb{R}^{C \times HW}$ and $g_p$ (308 in FIG. 3) is a 1×1 convolutional layer. This final feature map $F_{pan}$ (310 in FIG. 3) carries the enhanced panoptic signals over the spatial pixel locations and is fed to the final prediction stage to generate the semantic and instance segmentations, and the final panoptic segmentation, as depicted in FIG. 1.

Example Method for Performing Relational Panoptic Segmentation

Figure 4:
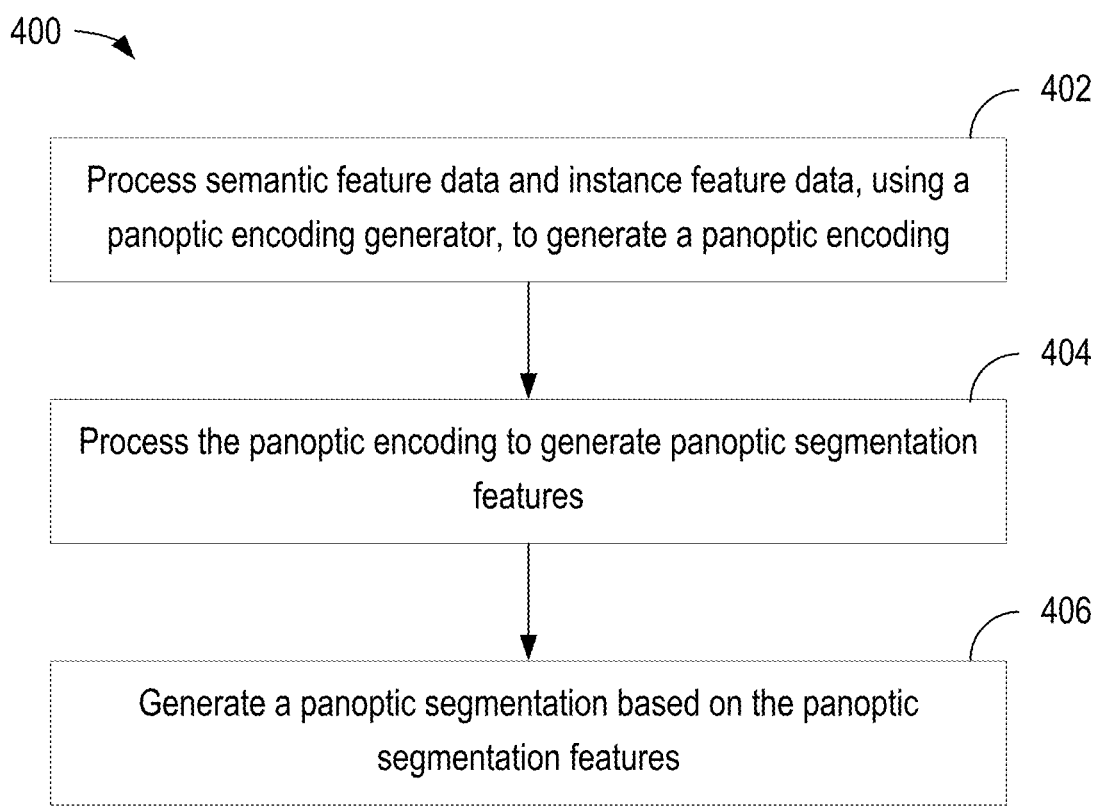
FIG. 4 depicts an example method for generating a panoptic segmentation with a panoptic segmentation model.

FIG. 4 depicts an example method 400 for generating a panoptic segmentation (e.g., 118 in FIG. 1) with a panoptic segmentation model.

Method 400 begins at step 402 with processing semantic feature data and instance feature data with a panoptic encoding generator, such as by panoptic encoding generator 110 described with respect to FIG. 1, to generate a panoptic encoding (e.g., $E_{pan}$).

Method 400 then proceeds to step 404 with processing the panoptic encoding to generate panoptic segmentation features (e.g., $F_{pan}$ in FIG. 3).

Method 400 then proceeds to step 406 with generating the panoptic segmentation based on the panoptic segmentation features (e.g., as in FIGS. 1 and 3).

In some aspects, method 400 further includes generating, via a shared backbone feature extractor (e.g., backbone network 102 in FIG. 1), common feature data (e.g., F in FIGS. 2 and 3) based on input image data.

In some aspects, method 400 further includes processing the common feature data with a semantic generator element (e.g., semantic generator 106 described with respect to FIG. 1) configured to perform semantic segmentation to generate the semantic feature data.

In some aspects, method 400 further includes processing the common feature data with an instance generator element (e.g., instance generator 108 described with respect to FIG. 1) configured to perform instance segmentation to generate the instance feature data.

In some aspects, processing the panoptic encodings (e.g., $E_{pan}$ in FIG. 3) includes: reweighting the panoptic encodings to generate weighted panoptic encodings (e.g., $\tilde{E}_{pan}$ in FIG. 3); convolving the weighted panoptic encodings (e.g., with $g_s$ (306) in FIG. 3); convolving the common feature data (e.g., with h (304) in FIG. 3); multiplying the convolved weighted panoptic encodings with the convolved common feature data (e.g., at operator 305 in FIG. 3) to generate spatial panoptic features (e.g., $F_{sp}$ in FIG. 3); convolving the spatial panoptic features (e.g., with $g_p$ (308) in FIG. 3) to generate modified spatial panoptic features; and multiplying the weighted panoptic encodings and the modified spatial panoptic features (e.g., at operator 307 in FIG. 3) to generate the panoptic segmentation features (e.g., $F_{pan}$ in FIG. 3).

In some aspects, method 400 further includes reweighting the panoptic encoding (e.g., $E_{pan}$ in FIG. 3) to generate weighted panoptic encodings (e.g., $\tilde{E}_{pan}$ in FIG. 3). For example, reweighting may be performed prior to applying the panoptic relational attention, as depicted and described with respect to FIG. 3. In some aspects, reweighting may be performed by a neural network, such a convolutional neural network.

In some aspects, the panoptic encodings comprise a pixel-wise similarity map between panoptic encodings and query features.

In some aspects, the panoptic segmentation is based on a predicted instance class and a predicted segment class.

In some aspects, the semantic generator comprises a convolutional neural network model.

In some aspects, the instance generator comprises a convolutional neural network model.

In some aspects, method 400 further includes: generating an intermediate instance loss; generating an intermediate segmentation loss; generating a final instance loss; generating a final segmentation loss; and refining a panoptic segmentation model based on the intermediate instance loss, the intermediate segmentation loss, the final instance loss, and the final segmentation loss, such as described above with respect to Equation 1.

In some aspects, refining the panoptic segmentation model based on the intermediate instance loss, the intermediate segmentation loss, the final instance loss, and the final segmentation loss comprises backpropagating the intermediate instance loss, the intermediate segmentation loss, the final instance loss, and the final segmentation loss through the panoptic segmentation model, such as described above with respect to Equation 1.

Example Processing System

Figure 5:
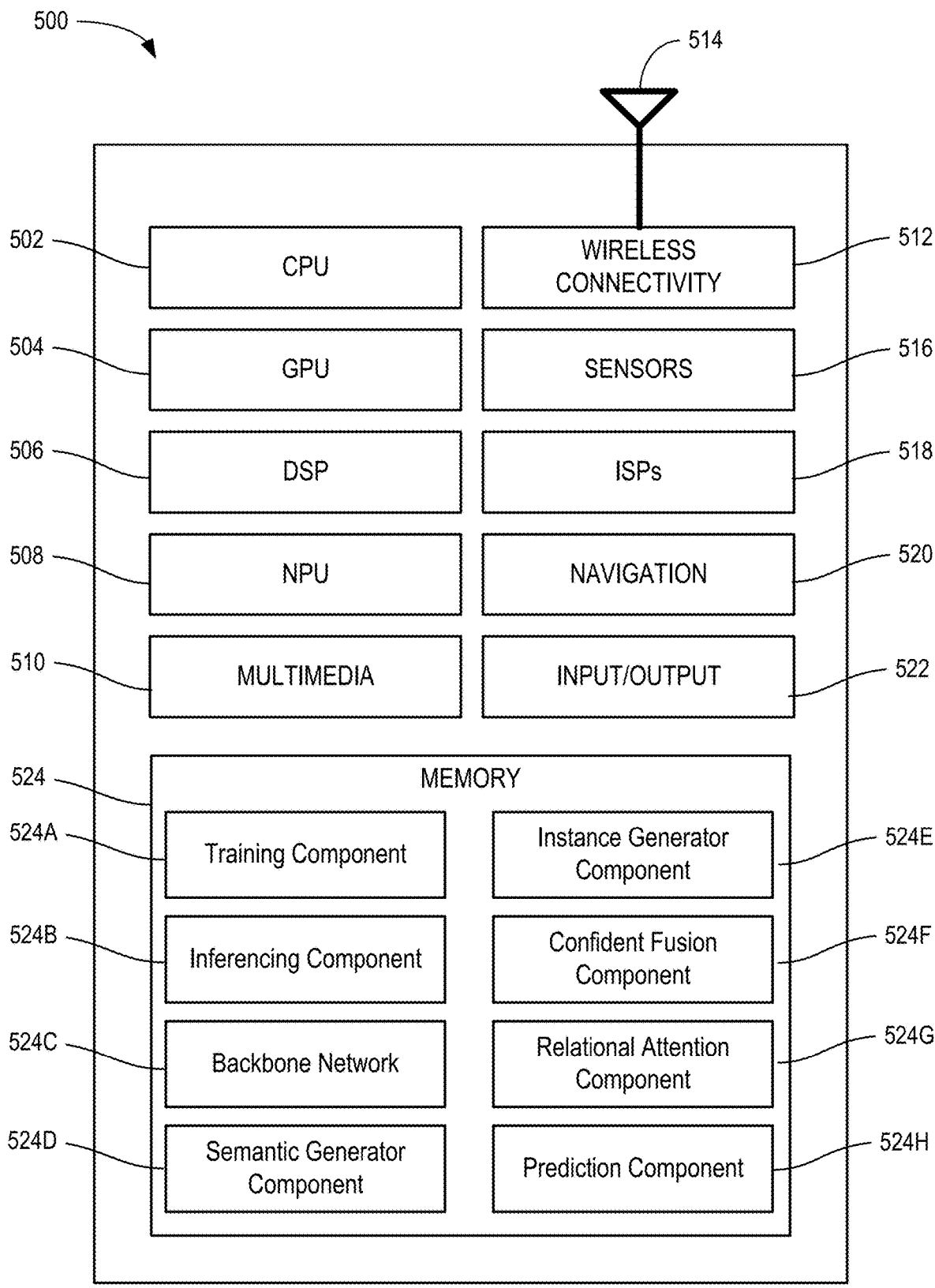
FIG. 5 depicts an example processing system that may be configured to perform the methods described herein.

FIG. 5 depicts an example processing system 500 that may be configured to perform the methods described herein, such as with respect to FIGS. 1-4.

Processing system 500 includes a central processing unit (CPU) 502, which in some examples may be a multi-core CPU. Instructions executed at the CPU 502 may be loaded, for example, from a program memory associated with the CPU 502 or may be loaded from memory partition 524.

Processing system 500 also includes additional processing components tailored to specific functions, such as a graphics processing unit (GPU) 504, a digital signal processor (DSP) 506, a neural processing unit (NPU) 508, a multimedia processing unit 510, and a wireless connectivity component 512.

An NPU, such as 508, is generally a specialized circuit configured for implementing all the necessary control and arithmetic logic for executing machine learning algorithms, such as algorithms for processing artificial neural networks (ANNs), deep neural networks (DNNs), random forests (RFs), kernel methods, and the like. An NPU may sometimes alternatively be referred to as a neural signal processor (NSP), a tensor processing unit (TPU), a neural network processor (NNP), an intelligence processing unit (IPU), or a vision processing unit (VPU).

NPUs, such as 508, may be configured to accelerate the performance of common machine learning tasks, such as image classification, machine translation, object detection, and various other tasks. In some examples, a plurality of NPUs may be instantiated on a single chip, such as a system on a chip (SoC), while in other examples they may be part of a dedicated machine learning accelerator device.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process it through an already trained model to generate a model output (e.g., an inference).

In some embodiments, NPU 508 may be implemented as a part of one or more of CPU 502, GPU 504, and/or DSP 506.

In some embodiments, wireless connectivity component 512 may include subcomponents, for example, for third generation (3G) connectivity, fourth generation (4G) connectivity (e.g., 4G LTE), fifth generation connectivity (e.g., 5G or NR), Wi-Fi connectivity, Bluetooth connectivity, and other wireless data transmission standards. Wireless connectivity processing component 512 is further connected to one or more antennas 514.

Processing system 500 may also include one or more sensor processing units 516 associated with any manner of sensor, one or more image signal processors (ISPs) 518 associated with any manner of image sensor, and/or a navigation processor 520, which may include satellite-based positioning system components (e.g., GPS or GLONASS) as well as inertial positioning system components.

Processing system 500 may also include one or more input and/or output devices 522, such as screens, touch-sensitive surfaces (including touch-sensitive displays), physical buttons, speakers, microphones, and the like.

In some examples, one or more of the processors of processing system 500 may be based on an ARM or RISC-V instruction set.

Processing system 500 also includes various circuits in accordance with the various embodiments described herein.

Processing system 500 also includes memory 524, which is representative of one or more static and/or dynamic memories, such as a dynamic random access memory, a flash-based static memory, and the like. In this example, memory 524 includes computer-executable components, which may be executed by one or more of the aforementioned components of processing system 500.

In particular, in this example, memory 524 includes training component 524A, inferencing component 524B, backbone network 524C, semantic generator component 524D, instance generator component 524E, confident fusion component 524F, relational attention component 524G, and prediction component 524H. Various component may include model parameters, such as weights, biases, and other machine learning model parameters. One or more of the depicted components, as well as others not depicted, may be configured to perform various aspects of the methods described herein.

Generally, processing system 500 and/or components thereof may be configured to perform the methods described herein.

Notably, in other embodiments, aspects of processing system 500 may be omitted, such as where processing system 500 is a server computer or the like. For example, multimedia component 510, wireless connectivity 512, sensors 516, ISPs 518, and/or navigation component 520 may be omitted in other embodiments. Further, aspects of processing system 500 maybe distributed.

Note that FIG. 5 is just one example, and in other examples, alternative processing system with more, fewer, and/or different components may be used.

Example Clauses

Implementation examples are described in the following numbered clauses:

Clause 1: A processor-implemented method for processing image data, comprising: processing semantic feature data and instance feature data with a panoptic encoding generator to generate a panoptic encoding; processing the panoptic encoding to generate panoptic segmentation features; and generating the panoptic segmentation based on the panoptic segmentation features.

Clause 2: The method of Clause 1, further comprising: generating, via a shared backbone feature extractor, common feature data based on input image data; processing the common feature data with a semantic generator element configured to perform semantic segmentation to generate the semantic feature data; and processing the common feature data with an instance generator element configured to perform instance segmentation to generate the instance feature data.

Clause 3: The method of Clause 2, wherein processing the panoptic encodings comprises: reweighting the panoptic encodings to generate weighted panoptic encodings; convolving the weighted panoptic encodings; convolving the common feature data; multiplying the convolved weighted panoptic encodings with the convolved common feature data to generate spatial panoptic features; convolving the spatial panoptic features to generate modified spatial panoptic features; and multiplying the weighted panoptic encodings and the modified spatial panoptic features to generate the panoptic segmentation features.

Clause 4: The method of any one of Clauses 1-3, further comprising reweighting the panoptic encoding to generate a weighted panoptic encoding prior to processing the panoptic encoding.

Clause 5: The method of any one of Clauses 1-4, wherein the panoptic encoding comprises a pixel-wise similarity map between panoptic encodings and query features.

Clause 6: The method of any one of Clauses 1-5, wherein the panoptic segmentation is based on a predicted instance class and a predicted segment class.

Clause 7: The method of any one of Clauses 1-6, wherein the semantic generator comprises a convolutional neural network model.

Clause 8: The method of any one of Clauses 1-7, wherein the instance generator comprises a convolutional neural network model.

Clause 9: The method of any one of Clauses 2-8, further comprising: generating an intermediate instance loss; generating an intermediate segmentation loss; generating a final instance loss; generating a final segmentation loss; and refining a panoptic segmentation model based on the intermediate instance loss, the intermediate segmentation loss, the final instance loss, and the final segmentation loss.

Clause 10: The method of Clause 9, wherein refining the panoptic segmentation model based on the intermediate instance loss, the intermediate segmentation loss, the final instance loss, and the final segmentation loss comprises backpropagating the intermediate instance loss, the intermediate segmentation loss, the final instance loss, and the final segmentation loss through the panoptic segmentation model.

Clause 11: A processing system, comprising: a memory comprising computer-executable instructions; and one or more processors configured to execute the computer-executable instructions and cause the processing system to perform a method in accordance with any one of Clauses 1-10.

Clause 12: A processing system, comprising means for performing a method in accordance with any one of Clauses 1-10.

Clause 13: A non-transitory computer-readable medium comprising computer-executable instructions that, when executed by one or more processors of a processing system, cause the processing system to perform a method in accordance with any one of Clauses 1-10.

Clause 14: A computer program product embodied on a computer-readable storage medium comprising code for performing a method in accordance with any one of Clauses 1-10.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A processor-implemented method for processing image data, comprising:
   generating, via a shared backbone feature extractor, common feature data based on input image data;
   processing the common feature data with a semantic generator element configured to perform semantic segmentation to generate semantic feature data;
   processing the common feature data with an instance generator element configured to perform instance segmentation to generate instance feature data;
   processing the semantic feature data and the instance feature data, using a panoptic encoding generator, to generate panoptic encodings;
   processing the panoptic encodings to generate panoptic segmentation features;
   generating a panoptic segmentation, using a panoptic segmentation model, based on the panoptic segmentation features;
   generating an intermediate instance loss based on the instance feature data;
   generating a final instance loss based on the panoptic segmentation; and
   refining the panoptic segmentation model based on the intermediate instance loss and the final instance loss.

2. The method of claim 1, wherein processing the panoptic encodings comprises:
   reweighting the panoptic encodings to generate weighted panoptic encodings;
   convolving the weighted panoptic encodings;
   convolving the common feature data;
   multiplying the convolved weighted panoptic encodings with the convolved common feature data to generate spatial panoptic features;
   convolving the spatial panoptic features to generate modified spatial panoptic features; and
   multiplying the weighted panoptic encodings and the modified spatial panoptic features to generate the panoptic segmentation features.

3. The method of claim 1, further comprising reweighting the panoptic encoding to generate a weighted panoptic encoding prior to processing the panoptic encoding.

4. The method of claim 1, wherein the panoptic encoding comprises a pixel-wise similarity map between panoptic encodings and query features.

5. The method of claim 1, wherein the panoptic segmentation is based on a predicted instance class and a predicted segment class.

6. The method of claim 1, wherein the semantic generator element comprises a convolutional neural network model.

7. The method of claim 1, wherein the instance generator element comprises a convolutional neural network model.

8. The method of claim 1, further comprising:
   generating an intermediate segmentation loss;
   generating a final segmentation loss; and
   refining the panoptic segmentation model based on the intermediate segmentation loss and the final segmentation loss.

9. The method of claim 8, wherein refining the panoptic segmentation model based on the intermediate instance loss, the intermediate segmentation loss, the final instance loss, and the final segmentation loss comprises backpropagating the intermediate instance loss, the intermediate segmentation loss, the final instance loss, and the final segmentation loss through the panoptic segmentation model.

10. A processing system, comprising:
one or more memories comprising instructions; and
one or more processors configured, individually or collectively, to execute the instructions and cause the processing system to:
generate, via a shared backbone feature extractor, common feature data based on input image data;
process the common feature data with a semantic generator element configured to perform semantic segmentation to generate semantic feature data;
process the common feature data with an instance generator element configured to perform instance segmentation to generate instance feature data;
process the semantic feature data and the instance feature data with a panoptic encoding generator to generate a panoptic encoding;
process the panoptic encoding to generate panoptic segmentation features; and
generate a panoptic segmentation, using a panoptic segmentation model, based on the panoptic segmentation features;
generate an intermediate instance loss based on the instance feature data;
generate a final instance loss based on the panoptic segmentation; and
refine the panoptic segmentation model based on the intermediate instance loss and the final instance loss.

11. The processing system of claim 10, wherein in order to process the panoptic encoding, the one or more processors are configured to further cause the processing system to:
generate spatial panoptic features based on the common feature data and the panoptic encoding;
convolve the panoptic encoding to generate a value encoding;
convolve the spatial panoptic features to generate a modified spatial panoptic features; and
multiply the value encoding and the modified spatial panoptic features to generate the panoptic segmentation features.

12. The processing system of claim 10, wherein the one or more processors are configured to further cause the processing system to reweight the panoptic encoding to generate a weighted panoptic encoding prior to processing the panoptic encoding.

13. The processing system of claim 10, wherein the panoptic encoding comprises a pixel-wise similarity map between panoptic encodings and query features.

14. The processing system of claim 10, wherein the panoptic segmentation is based on a predicted instance class and a predicted segment class.

15. The processing system of claim 10, wherein the semantic generator element comprises a convolutional neural network model.

16. The processing system of claim 10, wherein the instance generator element comprises a convolutional neural network model.

17. The processing system of claim 10, wherein the one or more processors are configured to further cause the processing system to:
generate an intermediate segmentation loss;
generate a final segmentation loss; and
refine the panoptic segmentation model based on the intermediate segmentation loss and the final segmentation loss.

18. The processing system of claim 17, wherein in order to refine the panoptic segmentation model based on the intermediate instance loss, the intermediate segmentation loss, the final instance loss, and the final segmentation loss, the one or more processors are configured to further cause the processing system to backpropagate the intermediate instance loss, the intermediate segmentation loss, the final instance loss, and the final segmentation loss through the panoptic segmentation model.

19. A non-transitory computer-readable medium comprising instructions that, when executed, individually or collectively, by one or more processors of a processing system, cause the processing system to perform a method for processing image data, the method comprising:
generating, via a shared backbone feature extractor, common feature data based on input image data;
processing the common feature data with a semantic generator element configured to perform semantic segmentation to generate semantic feature data;
processing the common feature data with an instance generator element configured to perform instance segmentation to generate instance feature data;
processing the semantic feature data and the instance feature data with a panoptic encoding generator to generate a panoptic encoding;
processing the panoptic encoding to generate panoptic segmentation features;
generating a panoptic segmentation, using a panoptic segmentation model, based on the panoptic segmentation features;
generating an intermediate instance loss based on the instance feature data;
generating a final instance loss based on the panoptic segmentation; and
refining the panoptic segmentation model based on the intermediate instance loss and the final instance loss.

* * * * *